United States Patent
Mainguy et al.

(10) Patent No.: US 7,603,265 B2
(45) Date of Patent: Oct. 13, 2009

(54) METHOD OF CONSTRUCTING A GEOMECHANICAL MODEL OF AN UNDERGROUND ZONE INTENDED TO BE COUPLED WITH A RESERVOIR MODEL

(75) Inventors: Marc Mainguy, Nanterré (FR); Pascal Longuemare, Saint-Germain-en-Laye (FR); Patrick Lemonnier, Paris (FR); Florent Chalon, Chinon (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 347 days.

(21) Appl. No.: 11/104,442

(22) Filed: Apr. 13, 2005

(65) Prior Publication Data
US 2005/0234690 A1   Oct. 20, 2005

(30) Foreign Application Priority Data
Apr. 14, 2004   (FR) .................................. 04 03889

(51) Int. Cl.
*G06F 9/455* (2006.01)
(52) U.S. Cl. ............................... 703/10; 703/2; 702/13
(58) Field of Classification Search ............... 703/10, 703/2; 166/300; 702/9, 13
See application file for complete search history.

(56) References Cited

U.S. PATENT DOCUMENTS

| | | | |
|---|---|---|---|
| 6,662,109 B2 | 12/2003 | Roggero et al. | |
| 6,826,520 B1 * | 11/2004 | Khan et al. | 703/10 |
| 6,928,399 B1 * | 8/2005 | Watts et al. | 703/2 |
| 2002/0120429 A1 * | 8/2002 | Ortoleva | 703/2 |
| 2003/0046005 A1 * | 3/2003 | Haarstad | 702/9 |
| 2003/0078733 A1 * | 4/2003 | Stone | 702/13 |
| 2003/0196810 A1 * | 10/2003 | Vinegar et al. | 166/300 |
| 2004/0015295 A1 * | 1/2004 | Bratvedt et al. | 702/13 |
| 2006/0184347 A1 * | 8/2006 | Noetinger et al. | 703/10 |
| 2006/0241925 A1 * | 10/2006 | Schaaf et al. | 703/10 |

OTHER PUBLICATIONS

Li D., and Beckner B.: "Optimal Uplayering for Scaleup of Multi-million-Cell Geologic Models" SPE Annual Technical Conference and Exhibition, No. 62927, Oct. 2000, Dallas, TX.

(Continued)

*Primary Examiner*—Paul L Rodriguez
*Assistant Examiner*—Kandasamy Thangavelu
(74) *Attorney, Agent, or Firm*—Antonelli, Terry, Stout & Kraus, LLP.

(57) ABSTRACT

A method of the invention provides improvement in the quality of coupled simulations between geomechanical and reservoir models by constructing a geomechanical model of an underground zone intended to be coupled with a reservoir model allowing simulation of fluid flows in the zone, from a geological model of the zone discretized by a fine grid. Geomechanical properties are associated with the various cells of the geological model on the basis of experimental data, the underground zone is discretized by a geomechanical grid with larger cells than the geological grid, and a scale change is applied to the geomechanical data included in the geological model in order to define equivalent geomechanical properties at the scale of the geomechanical grid of the zone.

4 Claims, 4 Drawing Sheets

OTHER PUBLICATIONS

Stern D. and Dawson A.G.: "A Technique for Generating Reservoir Similation Grids to Preserve Geologic Heterogeneity" SPE Resevior Simulation Symposium, No. 51942, 1999, XP002298644 Houston.

Tran TT et al: "Efficient conditioning of 3D fine-scale reservoir model to multiphase production data using stream line-based coarse-scale inversion and geostatistical downscaling" Oct. 3, 1999, SPE Annual Technical Conference and Exhibition, pp. 1-13 XP002186718.

Durlofsky L. et al: "Scale up of heterogeneous three dimensional reservoir descriptions" SPE Annual Technical Conference and Exhibition No. 30709, Oct. 22, 1995 pp. 313-326, XP002186719.

Chin, LY, and Thomas LK, "Fully Coupled Analysis of Improved Oil Recovery by Reservoir Compaction", *SPE International*, SPE 56753, pp. 1-10, and SPE Annual Technical Conference and Exhibition, held in Houston, Texas 1999; 393-401.

Ewing, R.E., "Aspects of Upscaling in Simulation of Flow in Porous Media", *Advances in Water Resources*, vol. 20, Nos. 5-6, pp. 349-358, 1997.

Gutlerrez, M. and Makurat, A., "Coupled HTM Modelling of Cold Water Injection in Fractured Hydrocarbon Reservoirs", *International Journal of Rock Mechanics and Mining Science*, vol. 34, No. ¾, p. 429, paper No. 113, 1997.

Koutsabeloulis, NC, Heffer KJ, Wong S., "Numerical Geomechanics in Reservoir Engineering", Computer Methods and Advances in Geomechanics, Siriwardane and Zaman eds., Balkema, Rotterdam, 1994, pp. 2097-2104.

Longuemare, P., Mainguy, J., Lemonnier P, Onaisi A. Gerard Ch, Koutsabeloulis N., "Geomechanics in Reservoir Simulation: Overview of Coupling Methods and Field Case Study", *Oil & Gas Science and Technology*, 2002, vol. 57(5), pp. 471-483.

Mainguy, M. and Longuemare, P., "Coupling Fluid Flow and Rock Mechanics: Formulations of the Partial Coupling Between Reservoir and Geomechanical Simulators", *Oil and Gas Science and Technology* 2002: vol. 57(4), pp. 355-367.

Renard, P., de Marsily G., "Calculating Equivalent Permeability: a Review", *Advances in Water Resources*, vol. 20, Nos. 5-6, pp. 253-278, 1997.

Reuss, A., "Calculation of the Flow Limits of Mixed Crystals on the Basis of the Plasticity of Mono-crystals", *Z. Angew. Math. Mech.* 1929; 9: 49-58.

Salamon, MDG, "Elastic Moduli of a Stratified Rock Mass", *J. Rock Mech. Min. Sci.*, 1968; vol. 5, pp. 519-527.

Settari, A. and Mourits, FM, "Coupling of Geomechanics and Reservoir Simulation Models", *Computer Methods and Advances in Geomechanics*, 1994; pp. 2151-2158.

Settari, A., and Walters, DA, "Advances in Coupled Geomechanical and Reservoir Modeling With Applications to Reservoir Compaction" *SPE International* 51927, pp. 1-12 and SPE Reservoir Simulation Symposium, Houston, Texas 1999.

Stone, T., Garfield, B, Papanastasiou P., "Fully Coupled Geomechanics in a Commercial Reservoir Simulator", SPE European Petroleum Conference, Paris, France, 2000; 45-52 and *SPE International* 65107, pp. 1-8.

Voight, W., "Über die Beziehung Zwischen de beiden Elastizitätskonstanten isotroper Körper", *Ann. Phys.* 1889, 38: 573-587.

Wen, XH, Gomez-Hernandez JJ., "Upscaling Hydraulic Conductivities in Hetergeneous Media: An Overview", *Journal of Hydrology* 1996; 183, pp. ix-xxxii.

\* cited by examiner

METHOD OF CONSTRUCTING A GEOMECHANICAL MODEL OF AN UNDERGROUND ZONE INTENDED TO BE COUPLED WITH A RESERVOIR MODEL

BACKGROUND OF THE INVENTION

1. Field of the Invention

The present invention relates to a method of constructing a geomechanical model of an underground zone for coupling with a reservoir model to simulate fluid flows in the zone, from a geological model of the zone discretized by a fine grid.

2. Description of the Prior Art

The state of the art to which reference is made hereafter is described in the following books and publications:

Chin L Y, Thomas L K. Fully Coupled Analysis of Improved Oil Recovery by Reservoir Compaction. SPE Annual Technical Conference and Exhibition held in Houston, Tex. 1999; 393-401;

Ewing R E. Aspects of Upscaling in Simulation of Flow in Porous Media. Advances in Water Resources 1997; 20(5-6): 349-358;

Gutierrez M, Makurat A. Coupled HTM Modelling of Cold Water Injection in Fractured Hydrocarbon Reservoirs. International Journal of Rock Mechanics and Mining Science, 1997; 34: 3-4;

Koutsabeloulis N C, Heffer K J, Wong S. Numerical Geomechanics in Reservoir Engineering. Computer methods and Advances in Geomechanics, Siriwardane and Zaman eds., Balkema, Rotterdam, 1994;

Longuemare P, Mainguy M, Lemonnier P, Onaisi A, Gerard Ch, Koutsabeloulis N. Geomechanics in Reservoir Simulation: Overview of Coupling Methods and Field Case Study. Oil and Gas Science and Technology 2002: 57(5): 471-483;

Mainguy M, Longuemare P. Coupling Fluid Flow and Rock Mechanics: Formulations of the Partial Coupling between Reservoirs and Geomechanical Simulators. Oil and Gas Science and Technology 2002: 57(4): 355-367;

Renard P, de Marsily G. Calculating Equivalent Permeability: a Review. Advances in Water Resources 1997; 20(5-6): 253-278;

Reuss A. Calculation of the Flow Limits of Mixed Crystals on the Basis of the Plasticity of Mono-Crystals, Z. Angew. Math. Mech. 1929; 9: 49-58;

Salamon M D G. Elastic Moduli of a Stratified Rock Mass. J. Rock Mech. Min. Sci., 1968; 5: 519-527;

Settari A, Mourits F M. Coupling of Geomechanics and Reservoir Simulation Models. Computer Methods and Advances in Geomechanics 1994; 2151-2158;

Settari A, Walters D A. Advances in Coupled Geomechanical and Reservoir Modeling with Applications to Reservoir Compaction. SPE Reservoir Simulation Symposium, Houston, Tex. 1999;

Stone T, Garfield B, Papanastasiou P. Fully Coupled Geomechanics in a Commercial Reservoir Simulator. SPE European Petroleum Conference, Paris, France, 2000; 45-52;

Voigt W. Über die Beziehung zwischen den beiden Elastizitätskonstanten isotroper Körper. Ann. Phys. 1889, 38: 573-587;

Wen X H, Gomez-Hernandez J J. Upscaling Hydraulic Conductivities in Heterogeneous Media: An Overview. Journal of Hydrology 1996; 183.

Reservoir simulations allow oil companies to precisely estimate the reserves of an oil reservoir and to optimize recovery of these reserves by studying different production schemes. Prior to reservoir simulation, it is necessary to characterize the reservoir in terms of geometry and of petrophysical properties. This characterization provides a detailed description of the reservoir in the form of a geological model. The detailed description of the geological model is used to construct a model of multiphase flow in porous media through a scaling process. The various stages allowing going from reservoir characterization to reservoir simulation can be presented as follows:

characterization of the reservoir to construct a fine geological model (small cells);

scaling the fine geological model to construct a coarser reservoir model (larger cells); and reservoir simulation from the reservoir model.

Characterization of the reservoir first requires its structural representation from surfaces (horizons and fault networks) describing the boundaries of structural blocks. This construction of the detailed geological model is carried out from the data provided by the wells and seismic data. The surfaces of the structural model are used as the basis for construction of a stratigraphic grid of finely gridded blocks as a function of geological criteria. The stratigraphic grids are thereafter provided with lithofacies and petrophysical properties (porosity and permeability). Assignment of the lithofacies and petrophysical properties is carried out from known well values and using geostatistical methods constrained by hypotheses on the geology of the sequences.

The geological model thus constructed provides a detailed description of the reservoir which cannot be used directly to model fluid flows in the reservoir. The reservoir grid used for modelling the flows is constructed from the geological model as a function of flow criteria. The scale difference between the reservoir and stratigraphic grids requires using scale change methods in order to define the petrophysical properties used for modelling the flows from information given at a smaller scale. Once this scaling stage is performed, reservoir simulation can be carried out.

Methods of this type are described for example in the aforementioned following publications: Wen and Gomez-Hernandez 1996, Ewing 1997, Renard and de Marsily 1997, and in patent application PCT WO-0/079,423.

The reservoir simulation carried out from the reservoir grid obtained after scaling models the multiphase flows of fluids in the reservoir. Some reservoir simulators furthermore have options allowing accounting for additional phenomena such as: thermal effects, constituents diffusion, double-porosity media processing. Besides, studying several little consolidated reservoir cases has shown the importance of the mechanical effects associated with the production of oil reservoirs. In fact, the reservoir model is more and more often coupled with a geomechanical model modelling the evolution of the stresses and deformations in the reservoir during production. The results of the geomechanical model are then used to modify the petrophysical properties of the reservoir model during reservoir simulation (Koutsabeloulis et al. 1994, Settari and Mourits 1994, Guttierez and Makurat 1997, Longuemare et al. 2002).

Coupling between the reservoir simulator and the geomechanical simulator can be achieved from two approaches described in the aforementioned references Settari and Mourits 1994, Settari and Walters 1999.

In a first approach, the flow and geomechanics problems are solved in the same simulator by internal coupling. This approach is for example adopted by Stone in the aforementioned publication Stone et al. 2000 and in U.S. Published patent application 2003/0,078,733. Taking account of the geomechanical behaviour appears therein as an option of the reservoir model.

In another approach, the flow and geomechanics problems are solved by external coupling of two simulators. Coupling is performed by data exchange between the reservoir and mechanical simulators as described, for example, in the aforementioned publications as follows: Settari and Mourits 1994, Chin and Thomas 1999, Mainguy and Longuemare 2002.

Whatever the approach used, modelling of the geomechanical a behavior of the reservoir generally comprises the following modelling stages:

a) construction of a geometry of the geological structure whose mechanical behavior is to be modelled;

b) gridding of the defined geometry;

c) assignment of the mechanical properties for each cell;

d) definition of initial boundary conditions and of a load record;

e) solution of the mechanical or thermo-poro-mechanical problem when the mechanical problem is coupled with thermal problems and/or problems of fluid flow in porous media; and f) post-processing and analysis of the results.

The geometry used for the geomechanical model is generally the same at the reservoir level as that of the reservoir model. It is furthermore often vertically and laterally extended so as to account for the rocky formations surrounding the reservoir. The size of the cells used to discretize the geometry defined above is similar to (in the reservoir) or larger than (for the surrounding formations) that of the cells used for reservoir simulation.

The cells of the geomechanical model are in most cases large (of the order of one hundred meters in the horizontal directions and of ten meters in the vertical direction) whereas the rock heterogeneity is at the origin of a variability of the mechanical properties within the geomechanical cell. Now, the computing techniques used require definition of homogeneous mechanical properties for each geomechanical cell, whatever its intrinsic heterogeneity degree.

The procedure commonly adopted by engineers who perform geomechanical simulations is to assign uniform mechanical properties per cell, without taking systematically account of the rock heterogeneity at a smaller scale. The drawback of this procedure is that it does not depend, or arbitrarily only, on the description of the rock at a smaller scale, that it rests on no scientific basis such as, for example, a homogenization method, and that it induces errors in the prediction of the reservoir behavior during its development.

SUMMARY OF THE INVENTION

The method according to the invention allows construction of a geomechanical model of an underground zone for coupling with a reservoir model allowing simulation of fluid flows in the zone, from a geological model of the zone discretized by a fine grid, representing a distribution in the cells of data relative to physical parameters obtained by measurements or explorations. It essentially comprises the following stages:

associating geomechanical properties with cells of the fine grid of the geological model on a basis of at least one of the following data: experimental, well and seismic data, and of the parameters of the geological model;

discretizing the underground zone by a geomechanical grid with larger cells than the geological grid; and applying a scale change to the geomechanical data included in the geological model so as to define geomechanical properties at a scale of the geomechanical grid of the zone.

According to an implementation mode, the scale change technique used can be different for each cell of the grid discretizing the geomechanical model.

According to the invention, the scale change technique used for a cell of the grid discretizing the geomechanical model can depend on the nature of the formations contained in the cell.

In cases where the formations contained in each geomechanical cell are of stratified nature, an analytical type scaling method can be applied.

In other cases where the formations contained in each geomechanical cell are of unstructured nature, a numerical type scaling method can be applied.

The method is particularly advantageous because the use of equivalent mechanical properties accounting for the real structure of the rock at a small scale allows the geomechanical simulation to be made more realistic. Thus, the quality of the coupled reservoir-geomechanical simulations, and therefore the hydrocarbon recovery predictions are improved.

BRIEF DESCRIPTION OF THE DRAWINGS

Other features and advantages of the method according to the invention will be clear from reading the description hereafter of non limitative embodiment examples, with reference to the accompanying figures wherein.

DETAILED DESCRIPTION OF THE INVENTION

Figure 1:
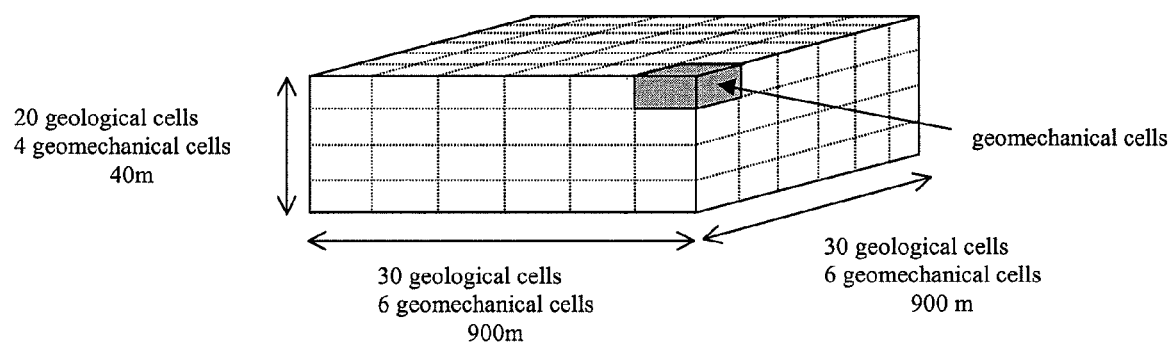
FIG. 1 shows the geological structure and its discretization in geomechanical cells.

The method according to the invention allows definition of the mechanical properties of geomechanical cells from the geological information and the mechanical properties of the rocks known at a small scale. It is essentially based on:

the use of the data of the geological model and the assignment of mechanical properties for each cell of the geological model in addition to the lithofacies and petrophysical properties. These mechanical properties can be obtained from laboratory test results, well data (logs) or charts, or they can be defined from the petrophysical properties of the geological cell or from the mineralogical composition of the lithofacies using correlations or laws, the use of scaling methods allowing definition of equivalent mechanical properties for the geomechanical cell from its discretization in the geological model and the mechanical properties associated with the geological grid. These equivalent mechanical properties must allow that the geomechanical cell behaves in an equivalent way to all of the geological cells of which it consists. The scaling methods can be numerical or analytical. The large-scale mechanical properties can be elastic (elastic strength tensor) or behavior law parameters describing the post-elastic (irreversible) behavior of the rock.

The above two points come within the stages of a coupled geomechanical-reservoir calculation as follows:

characterization of the reservoir to construct a fine geological model (small cells), scaling the fine geological model to construct a coarser reservoir model (larger cells), scaling the fine geological model to construct a coarser geomechanical model (larger cells)

coupled reservoir and geomechanical simulation from the reservoir and geomechanical models.

The first point, which is used in the first stage, enriches the geological model by defining, for each cell thereof, mechanical properties allowing description of the small-scale mechanical behavior of this cell. The second point, used in the third stage, relates to scaling of mechanical properties by means of a scale change method in order to define equivalent mechanical properties for each cell of the geomechanical grid. The scaling method used will be the best suited to the structure of each geomechanical cell by taking for example into consideration the inclusive, stratified or totally unstructured nature of the lithofacies distribution within the geomechanical cell. All of the mechanical parameters given at the scale of the geological cell have to be scaled. A final geomechanical model of the mechanical properties of each cell of which account for the heterogeneity of the lithofacies and mechanical properties within the latter is obtained. As mentioned above, the use of equivalent mechanical properties accounting for the small-scale real structure of the rock allows making the geomechanical simulation more realistic. This thus allows improvement of the quality of the coupled reservoir-geomechanical simulations which are modelling fluid flows on the reservoir grid and stresses and deformations on the geomechanical grid, and therefore the hydrocarbon recovery predictions.

To calculate the equivalent mechanical properties for the geomechanical grid according to the invention, the following stages are carried out:

assigning, for each cell of the geological model, mechanical properties obtained from experimental or field data, charts or from the literature. The mechanical properties considered can be elastic (Young's modulus and Poisson's ratios or equivalents) or they can be parameters of behavior laws expressing the irreversible behavior of the materials making up the geological cells. These mechanical properties can be correlated to the lithofacies of the geological cells and to their petrophysical properties;

scanning the geomechanical cells of the geological structure for which equivalent mechanical properties are to be calculated;

for each geomechanical cell studied, recovering the mechanical properties of the geological cells that make up the geomechanical cell considered; and implementing a scaling method allowing calculation of an equivalent mechanical property for the geomechanical cell from the mechanical properties given for the geological cells. The equivalent mechanical properties of the geomechanical cell are obtained from homogenization methods known from the literature or they are estimated from approximate methods: boundary calculation, simplifying hypotheses on the lithofacies distribution, approximation to or deletion of terms in homogenization methods, all methods known in the art.

The scaling methodology is illustrated hereafter with a synthetic case of a reservoir structure for which the equivalent elastic properties of each geomechanical cell are calculated from an analytical homogenization method. The reservoir structure whose behavior is to be modelled is shown in FIG. 1. Two description scales are associated with this reservoir structure:

a fine scale associated with the geological model and at which the rock heterogeneity is described; and a coarser scale associated with the geomechanical model and at which the mechanical properties of the geomechanical cells have to be calculated via a scaling procedure.

FIG. 1 also shows the geomechanical grid used for discretization of the reservoir structure at the scale referred to as macroscopic. The reservoir structure is subdivided into six geomechanical cells in directions x and y, and four geomechanical cells in direction z. The dimensions of the geomechanical cells are constant and equal to 150 m in directions x and y and 10 m in direction z. Each geomechanical cell has five geological cells in the three directions (see for example the discretization of the geomechanical cell in FIG. 2). Each geomechanical cell thus contains 125 geological cells of equal dimensions: 30 m in directions x and y, and 2 m in direction z. The distribution of the lithofacies on the geological grid is given by a file generated by a standard geomodeller. In the validation case presented, the existence of three different lithofacies is assumed: sandstone, argillaceous sandstone and clay. A lithofacies number corresponding to one of the previous three rock types is thus assigned to each cell of the geological model. The mechanical properties are also assumed to be directly associated with each lithofacies. The behavior of each lithofacies is assumed to have isotropic elastic properties with the elastic coefficients given in the table hereunder. A more precise study could relate the mechanical properties of a geological cell to its lithofacies and to its porosity or to the mineralogical composition of a lithofacies.

TABLE 1

Mechanical properties associated with each lithofacies

| Lithofacies colour | Lithofacies | Poisson's ratio ν (−) | Young's modulus E (Gpa) |
|---|---|---|---|
| Black | Sandstone | 0.2 | 20 |
| Dark grey | Argillaceous sandstone | 0.3 | 10 |
| Light grey | Clay | 0.4 | 4 |

Figure 2:
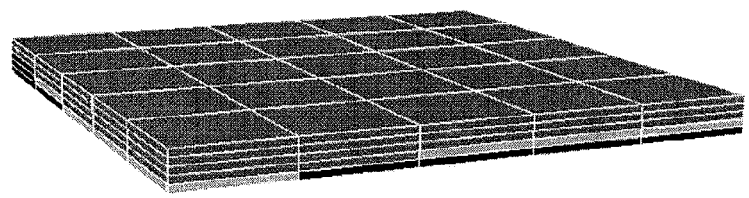
FIG. 2 shows an example of discretization of a geomechanical cell in 5×5×5 geological cells.
Figure 3:
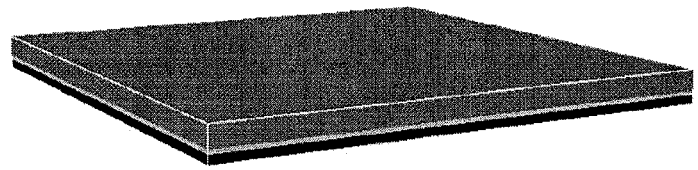
FIG. 3 shows a perfectly stratified configuration equivalent to this geomechanical cell.

In order to illustrate the scaling methodology, the geomechanical cell shown in FIG. 2 is extracted from the reservoir structure. Each color of this cell is associated with a lithofacies (see Table 1). For this cell, a homogenization method is used allowing calculation of the equivalent elastic properties of the geomechanical cell, assuming that it has a perfectly stratified structure. The homogenization method used is the method described in the aforementioned publication by Salamon (1968) for perfectly stratified materials. To implement this method, the geomechanical cell is considered as a perfectly stratified material where the volume of each lithofacie is the same as a volume of the geological cells present in the geomechanical cell containing the lithofacies. The perfectly stratified configuration equivalent to the geomechanical cell is shown in FIG. 3. This configuration has the following volume fractions for each lithofacies:

0.264 sandstone (black)

0.12 clay (light grey)

0.616 argillaceous sandstone (dark grey).

The homogenization method described by Salamon allows calculation of the five independent coefficients E1, E3, v12, v13 and µ13 defining the elasticity tensor for a transverse isotropic material of axis x3. Implementation of this method in the case of the perfectly stratified material shown in FIG. 1 gives the following equivalent elastic coefficients:

E1=11.962 GPa, E3=10.823 GPa, v12=0.262, v13=0.303 and µ13=4.741 GPa.

These coefficients allow calculation of the homogenized elasticity tensor and its inverse, the homogenized rigidity tensor given in GPa by:

$$\underline{\underline{C}} = \begin{bmatrix} 15.186 & 5.705 & 5.722 & 0 & 0 & 0 \\ 5.705 & 15.186 & 5.722 & 0 & 0 & 0 \\ 5.722 & 5.722 & 13.958 & 0 & 0 & 0 \\ 0 & 0 & 0 & 3.625 & 0 & 0 \\ 0 & 0 & 0 & 0 & 3.625 & 0 \\ 0 & 0 & 0 & 0 & 0 & 4.741 \end{bmatrix}$$

The geomechanical cell considered has a stratified type structure (See FIG. 2) and the homogenization method thus applies well to this cell. In general, the scaling method to be used has to be selected depending on the morphology of the geomechanical cell whose equivalent mechanical properties are to be estimated. However, for certain unstructured lithofacies distributions, numerical scaling methods known in the art can be used, which presuppose no particular geomechanical cell morphology. It is also possible to estimate the equivalent mechanical properties of the geomechanical cell from a lower boundary and an upper boundary of the rigidity tensor, boundaries that are for example defined in the aforementioned publications as follows: Reuss (1929) and Voigt (1889).

Figure 4:
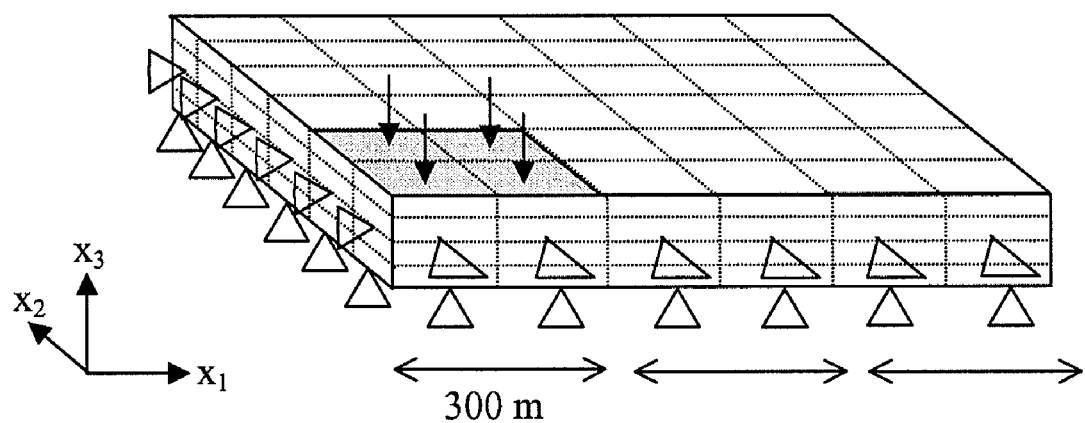
FIGS. 4 and 5 show the boundary conditions and the loads (normal and tangential) imposed on the geological structure.
Figure 5:
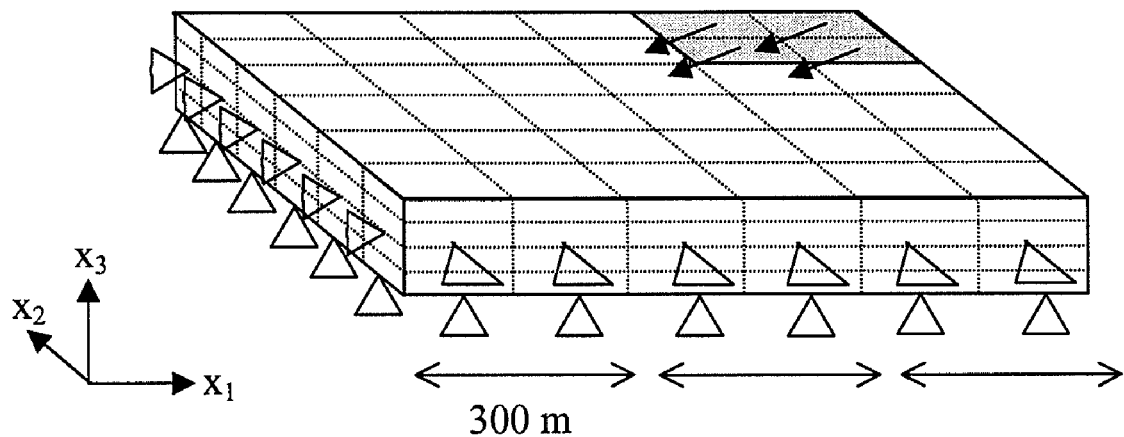

In the case of the geological structure studied, the equivalent rigidity tensors of all the geomechanical cells is calculated by means of the homogenization method described by Salamon. In order to show that the scaling methodology used is perfectly suitable to account for the heterogeneity of the structure at a small scale, the mechanical behavior thereof is compared when it is modelled at the fine scale of the geological model and at the coarser scale of the geomechanical model. In order to make the comparison independent of the grid difference between the two scales, the comparison is carried out with the same grids, that is the fine grid of the geological model. The boundary conditions of the calculation performed are as follows: the normal displacements at planes x3=0, x1=0 and x2=0 are blocked (See FIGS. 4 and 5). Two load cases are studied. For the first load case shown in FIG. 2, a normal 20 MPa load is imposed on ⅛ of the upper surface of the structure. The second load shown in FIG. 5 imposes a tangential 4 MPa load in direction x1=x2 on ⅛ of the upper surface of the geological structure. For each one of the two load cases, two calculations are carried out in a finite-element calculation code on the fine grid of the geological model:

1. A calculation for which the mechanical properties are assigned according to the lithofacies distribution given by the geological model. Each geological cell has the isotropic elastic properties given by Table 1 as a function of its lithofacies. This calculation is referred to hereafter as reference calculation;

2. A calculation for which the mechanical properties of each geological cell are given as a function of the geomechanical cell to which the geological cell is connected. The mechanical properties assigned to each geological cell are those of a transverse isotropic material of axis x3 calculated via the homogenization method described above. This calculation is referred to hereafter as an approximate calculation.

Figure 6:
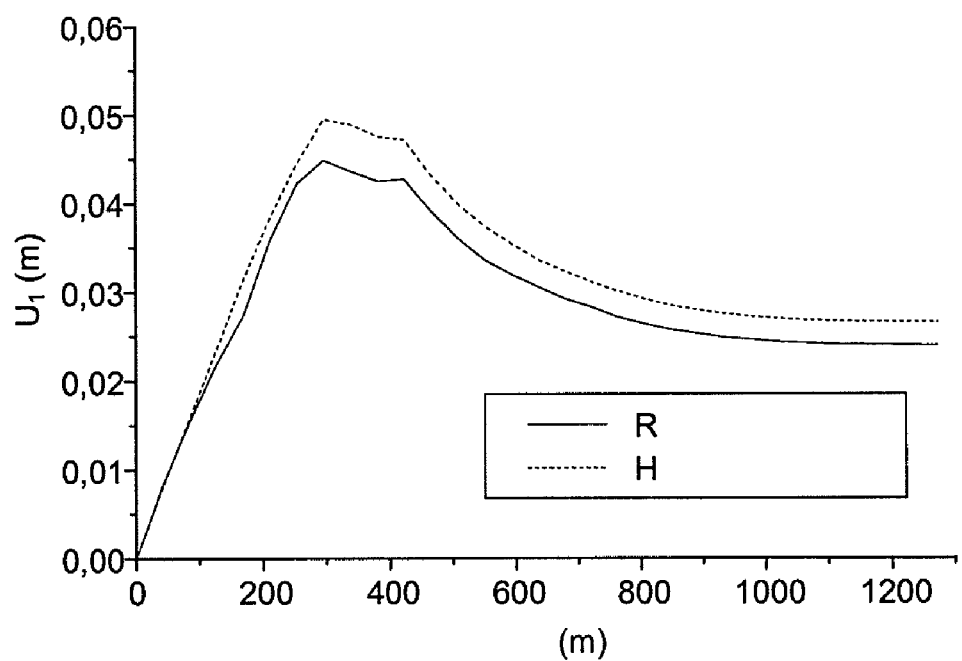
FIG. 6 compares, on a diagonal $x1=x2$ at the top of the reservoir (on the abscissa axis), the horizontal displacements in direction $x1$ (on the ordinate axis) obtained with the reference calculation (R) and the approximate calculation (H) in the case of the normal load of FIG. 4.
Figure 7:
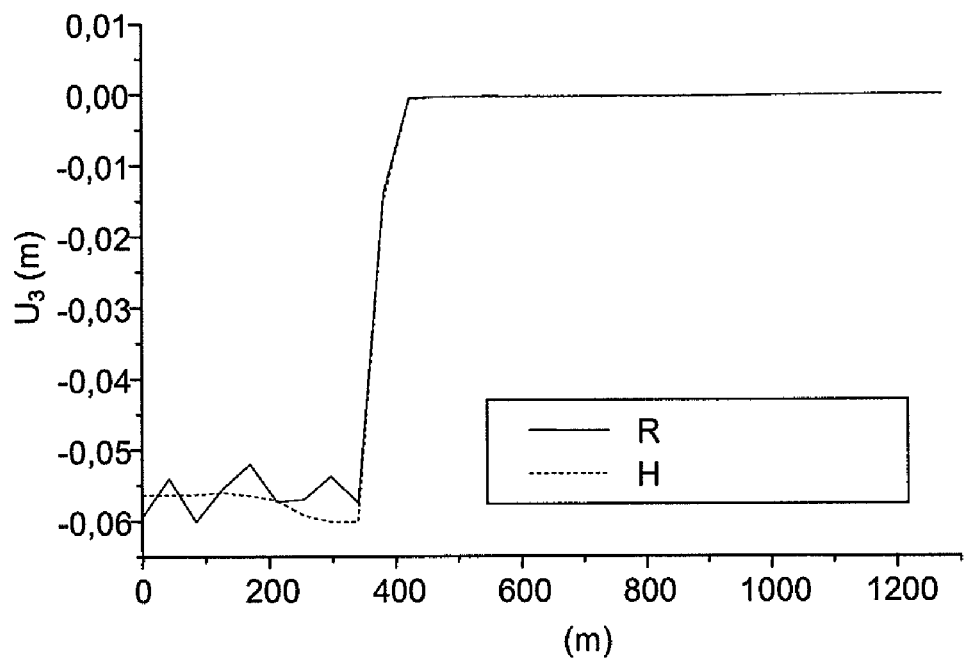
FIG. 7 compares, on the diagonal $x1=x2$ at the top of the reservoir (on the abscissa axis), the vertical displacements (on the ordinate axis) obtained with the reference calculation (R) and the approximate calculation (H) in the case of the normal load of FIG. 4.
Figure 8:
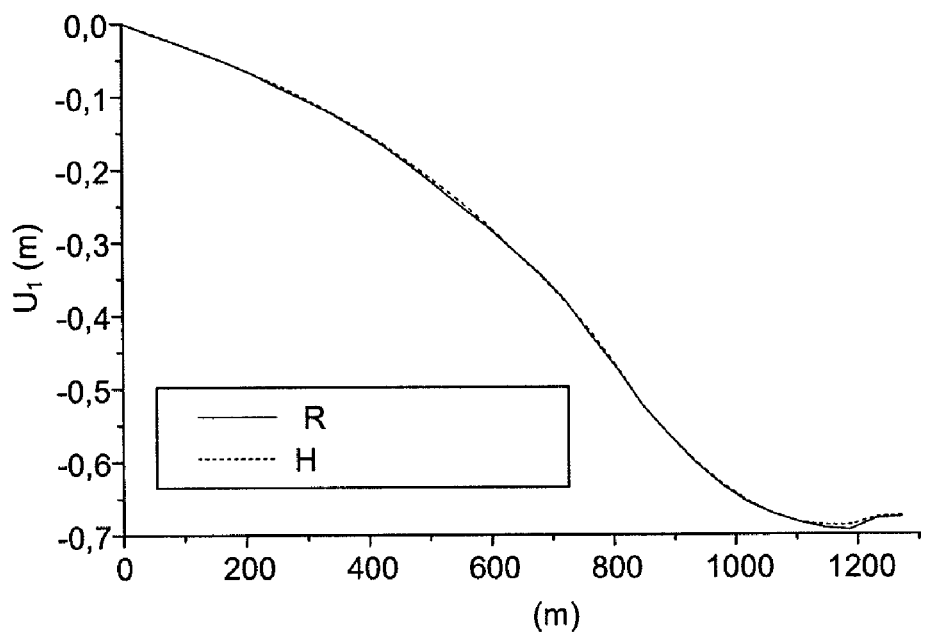
FIG. 8 compares, on the diagonal $x1=x2$ at the top of the reservoir (on the abscissa axis), the horizontal displacements in direction $x1$ (on the ordinate axis) obtained with the reference calculation (R) and the approximate calculation (H) in the case of the tangential load of FIG. 5.
Figure 9:
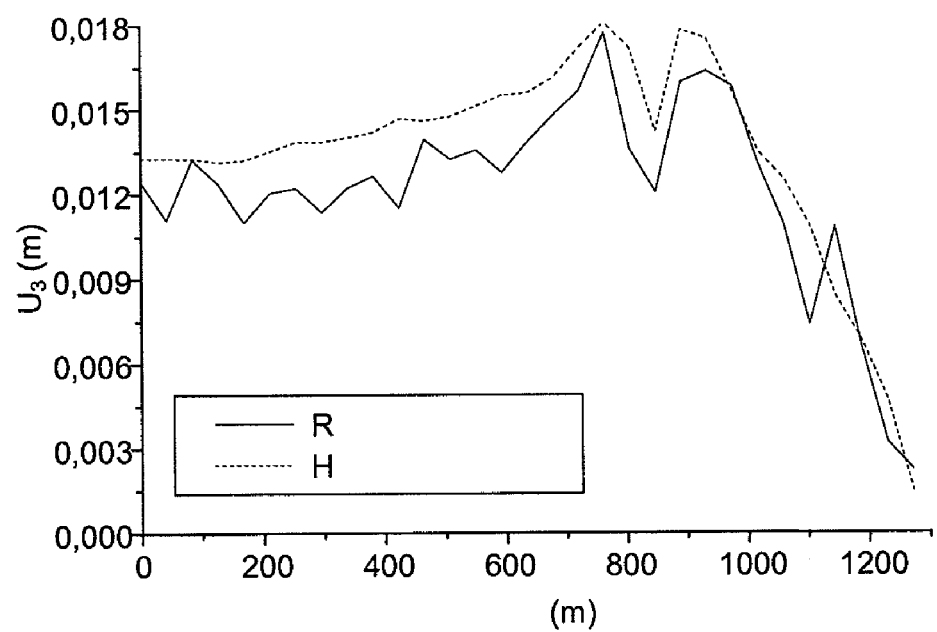
FIG. 9 compares, on the diagonal $x1=x2$ at the top of the reservoir (on the abscissa axis), the vertical displacements (on the ordinate axis) obtained with the reference calculation (R) and the approximate calculation (H) in the case of the tangential load of FIG. 5.

FIGS. 6 and 7 respectively compare the displacements on a diagonal x1=x2 along respectively x1 (abscissa axis) and x3 (ordinate axis) obtained by the two calculations, reference calculation (R) and approximate calculation (H), in the case of the normal load. The displacements along x1 and x3 are compared on a diagonal x1=x2 at the top of the geological structure (abscissa axis) where the displacements are the greatest. FIGS. 8 and 9 compare the displacements along respectively x1 (abscissa axis) and x3 (ordinate axis) obtained by the two calculations (reference calculation (R) and approximate calculation (H)) in the case of the tangential load. The displacements are also shown on a diagonal x1=x2 at the top of the geological structure. FIGS. 6 to 9 show that the displacements obtained by the two methods in the two load cases are very close.

In conclusion, the example described provides the methodology for scaling the mechanical properties of geomechanical cells from the distribution of the mechanical properties at the scale of the geological model. Furthermore, comparison of the calculations carried out for the whole of the geological structure using the mechanical properties at the fine scale of the geological model and the equivalent mechanical properties at the coarser scale of the geomechanical model shows that the equivalent mechanical properties used in the geomechanical model allow accounting for the heterogeneity of the properties of the materials at a smaller scale.

The invention claimed is:

1. A method of simulating geomechanical behavior of an underground reservoir by coupling with a reservoir model for simulation of fluid flows in the reservoir a geomechanical model that can simulate the geomechanical behavior, comprising:

acquiring data from the reservoir regarding geometry, lithofacies and petrophysical properties related to the reservoir wherein each lithofacies comprises a rock type;

constructing, using a computer, a geological model of the reservoir discretized by a fine grid utilizing the data;

constructing, using a computer, a reservoir model of multiphase flow by scaling the geological model wherein the reservoir model has cells larger than the cells of the geological model;

acquiring geomechanical properties related to the reservoir and assigning the geomechanical properties to the cells of the geological model;

constructing, using a computer, the geomechanical model of the reservoir discretized by a geomechanical grid wherein the geomechanical model has cells of same size or larger than the cells of the reservoir model;

performing, using a computer, a scaling method for calculating the geomechanical properties of the geomechanical cells of the geomechanical model, from the geomechanical properties of the geological cells;

performing, using a computer, a homogenization method to calculate the geomechanical properties at a scale of the geomechanical cells assuming that the geomechanical cells have a stratified structure, wherein each lithofacies contained in each geomechanical cell has a stratified distribution therein;

performing, using a computer, reservoir simulation using the reservoir model and determining multiphase flow characteristics and related petrophysical properties of the cells in the reservoir model;

performing, using a computer, simulation of geomechanical behavior using the geomechanical model and determining the geomechanical properties of the cells of the geomechanical model having a stratified structure; and using the results of simulation with the geomechanical model to modify the petrophysical properties of the reservoir model.

2. A method as claimed in claim 1, wherein the scaling method is analytical and is different for each cell of the grid discretizing the geomechanical model.

3. A method as claimed in claim 2, wherein the scaling method is analytical and is used for cells of the grid discretizing the geomechanical model which depend on the lithofacies contained in the grid.

4. A method as claimed in claim 1, wherein the scaling method is analytical and is used for cells of the grid discretizing the geomechanical model which depend on the lithofacies contained in the grid.

* * * * *